UNITED STATES PATENT OFFICE.

JOHN HOBBS, OF BOSTON, MASSACHUSETTS.

MANUFACTURE OF ARTIFICIAL BUTTER.

SPECIFICATION forming part of Letters Patent No. 263,042, dated August 22, 1882.

Application filed July 21, 1882. (No specimens.)

*To all whom it may concern:*

Be it known that I, JOHN HOBBS, of the city of Boston, in the county of Suffolk and State of Massachusetts, have invented an Improvement in the Manufacture of Artificial Butter, of which the following is a specification.

In the manufacture of oleomargarine-butter, it has been found that the product obtained by the use of what is called "animal oleomargarine" churned with milk is too brittle and friable except in warm weather. It has been attempted to overcome this difficulty by the admixture of animal oleine, or by the addition of vegetable oils of commerce. Both of these methods have been found objectionable.

I have discovered that by the use of the more infusible part of vegetable oils extracted from said vegetable oils by subjecting them to pressure at a temperature sufficient to allow the more fusible portions to run off, leaving the more infusible portions of the vegetable oils, composed mainly of vegetable stearine with some margarine, in the bags. It is this more infusible substance that I mix with the animal oleomargarine obtained by what is called the "Mége process," or analogous processes.

I mix my materials above described with animal oleomargarine before the emulsionizing process with the milk, &c., takes place—in the Mége process—by melting it and mixing it into the animal oleomargarine, also in the melted condition. I add from about ten to forty per cent. of this material. A larger proportion may be used in winter than in summer.

The advantages of this material are that it unites thoroughly with the animal oleomargarine and imparts to the whole compound a more butter-like texture than can be otherwise obtained.

The vegetable stearine to be used can be obtained from any pure vegetable, seed, or nut oils by pressing them at a temperature as above set forth, or it may be obtained in the market at times as vegetable stearine. I prefer that obtained from pressing cotton-seed oil, benne-oil, or mustard-seed oil. The vegetable oil may be purified or refined before pressure, or what I call the "vegetable stearine," may be purified after being extracted from the vegetable oil.

Having now described my invention, what I claim as new, and desire to secure by Letters Patent, is—

1. The herein-described process for the manufacture of artificial butter, which consists in mixing what I call "vegetable stearine" or "margarine," obtained substantially as described, with what is called "animal oleomargarine," and emulsionizing the said mixture with milk, cream, or other watery fluid.

2. The herein-described product, which consists of the compound of vegetable stearine or margarine with what is known as "animal oleomargarine."

In testimony of which invention I hereunto set my hand.

JOHN HOBBS.

Witnesses:
GEO. Z. ADAMS,
WM. B. H. DOWSE.